(12) United States Patent
Bennett et al.

(10) Patent No.: US 9,045,026 B2
(45) Date of Patent: Jun. 2, 2015

(54) MANUAL SOFT TOP WITH SPRING ASSIST MECHANISM

(71) Applicant: Omix-Ada, Inc., Suwanee, GA (US)

(72) Inventors: Patrick W. Bennett, Gainesville, GA (US); Christopher Douglas Van Buren, Snellville, GA (US); Alain Eboli, Lawrenceville, GA (US)

(73) Assignee: Omix-Ada, Inc., Suwanee, GA (US)

( * ) Notice: Subject to any disclaimer, the term of this patent is extended or adjusted under 35 U.S.C. 154(b) by 0 days.

(21) Appl. No.: 14/277,911

(22) Filed: May 15, 2014

(65) Prior Publication Data
US 2014/0339851 A1 Nov. 20, 2014

Related U.S. Application Data

(60) Provisional application No. 61/823,542, filed on May 15, 2013.

(51) Int. Cl.
*B60J 7/08* (2006.01)
*B60J 7/12* (2006.01)

(52) U.S. Cl.
CPC .................... *B60J 7/1226* (2013.01)

(58) Field of Classification Search
CPC .......... B26B 1/04; B26B 1/044; B26B 1/048; F41B 5/1469; B60N 3/023; A61B 17/0401; A61B 17/24; A61B 17/3417; A61B 2017/00814; A61B 2017/0412
USPC ............................................ 296/122, 107.09
See application file for complete search history.

(56) References Cited

U.S. PATENT DOCUMENTS

| | | | | |
|---|---|---|---|---|
| 2,817,345 | A * | 12/1957 | Woodruff, Sr. | 135/161 |
| 2,864,388 | A * | 12/1958 | Oliver | 135/133 |
| 3,285,259 | A * | 11/1966 | Hale | 114/361 |
| 4,260,188 | A * | 4/1981 | Bauer | 296/122 |
| 5,005,896 | A * | 4/1991 | Li | 296/100.18 |
| 5,772,274 | A * | 6/1998 | Tokarz | 296/107.09 |
| 5,775,767 | A * | 7/1998 | Harrison et al. | 296/107.09 |
| 5,887,937 | A * | 3/1999 | Searfoss | 296/122 |
| 6,068,326 | A * | 5/2000 | Shiromura | 296/120.1 |
| 6,080,123 | A * | 6/2000 | Pansiera | 602/16 |
| 6,095,589 | A * | 8/2000 | Kinnanen et al. | 296/107.09 |

(Continued)

*Primary Examiner* — Kiran B Patel
(74) *Attorney, Agent, or Firm* — Womble Carlyle Sandridge & Rice LLP

(57) ABSTRACT

A spring assist mechanism is disclosed for aiding manual deployment of a collapsible soft top that has a frame incorporating a back bow that includes spaced side struts joined at upper ends by a crossbar. The spring assist mechanism includes a bracket securable to the body of the vehicle on one side thereof. A pivot pin extends from the bracket to a distal end and a pivot plate is rotatably supported on the pivot pin. An attachment feature is fixed to the pivot plate displaced from the pivot pin and the pivot plate forms an attachment arm configured to be fixed to a lower end of one of the side struts. The pivot plate thus facilitates pivotal movement of the side strut and back bow between a generally vertical deployed configuration and a generally horizontal stowed configuration. A biasing member, which can be a coil spring, has a first end fixed relative to the bracket and a second end coupled to the attachment feature. The biasing member is configured to urge the pivot plate and an attached side strut and back bow toward the deployed configuration thereby aiding manual deployment of the soft top. Spring assist mechanisms may be disclosed on both sides of the vehicle if desired.

8 Claims, 6 Drawing Sheets

(56) References Cited

U.S. PATENT DOCUMENTS

| | | | |
|---|---|---|---|
| 6,293,605 B2* | 9/2001 | Neubrand | 296/76 |
| 6,295,713 B1* | 10/2001 | Hilliard et al. | 29/446 |
| 6,318,790 B1* | 11/2001 | Henning | 296/98 |
| 6,416,111 B1* | 7/2002 | Neubrand | 296/107.09 |
| 7,032,951 B2* | 4/2006 | Powell | 296/107.01 |
| 7,992,919 B2 | 8/2011 | Huotari et al. | |
| 8,376,447 B2* | 2/2013 | Just et al. | 296/107.08 |
| 2004/0012222 A1* | 1/2004 | Hollenbeck et al. | 296/107.09 |
| 2004/0145212 A1* | 7/2004 | MacFarland | 296/108 |
| 2004/0155479 A1* | 8/2004 | Willard | 296/107.01 |
| 2005/0258664 A1* | 11/2005 | Willard | 296/107.09 |
| 2007/0170750 A1* | 7/2007 | Just et al. | 296/121 |
| 2008/0224494 A1* | 9/2008 | Anderson et al. | 296/57.1 |
| 2011/0227364 A1* | 9/2011 | Neubrand et al. | 296/108 |
| 2011/0266826 A1* | 11/2011 | Prince et al. | 296/98 |
| 2012/0286540 A1* | 11/2012 | Moran et al. | 296/108 |

* cited by examiner

MANUAL SOFT TOP WITH SPRING ASSIST MECHANISM

REFERENCE TO RELATED APPLICATION

Priority is hereby claimed to the filing date of U.S. provisional patent application No. 61/823,542 filed on May 15, 2013.

TECHNICAL FIELD

This disclosure relates generally to vehicles having retractable soft tops, and in particular to vehicles with retractable soft tops that are manually movable between a deployed configuration and a stowed configuration.

BACKGROUND

Deployable soft tops for vehicles are commonly used in sport-utility vehicles that are used for recreational purposes. Such soft tops can typically be moved between a normally deployed configuration that protects the occupants of the vehicle from various weather conditions, and a stowed configuration that exposes the passenger compartment to ambience when the weather is pleasant and it is desired by the occupants to enjoy the more favorable and refreshing weather conditions while driving. Many deployable soft tops and manually deployed by the driver of the vehicle, perhaps with the assistance of another.

Current manually deployable soft tops are often considered quite cumbersome to move between the collapsed stowed configuration and the deployed configuration and vice versa. This is because, at least in part, the weight and size of the soft top is significant and often requires two or more people, one on each side of the vehicle, to move the soft top effectively and safely between the stowed and deployed configurations. Consequently, a need exists for a manual soft top having a fabric supporting collapsible frame that is movable from a stowed configuration to a deployed configuration and vice versa by a single person. Moving the soft top between the two positions should be quick, efficient, and easy for a single person standing on only one side of the vehicle. It is to the provision of such a manual soft top and to a spring assist mechanism therefor that the present disclosure is primarily directed.

SUMMARY

Briefly described, a spring assist mechanism is disclosed for aiding with the manual deployment of a soft top mounted on a vehicle. The spring assist mechanism includes a bracket configured to secure the spring assist mechanism to the body of the vehicle. A fixed pivot pin projects inwardly relative to the vehicle with the free end of the pivot pin having a first spring attachment feature. A pivot plate is rotatably mounted on the pivot pin and includes a second spring attachment feature spaced from the pivot pin and an outwardly projecting arm configured to be secured to the bottom end of a side strut of the back bow of the soft top frame. Rotation of the pivot plate causes the side strut and thus the back bow and entire frame to pivot about the pivot pin between a generally reawardly extending stowed position to a generally vertically extending deployed configuration. A coil spring is mounted on the pivot pin with an inner end of the coil spring secured within the slot of the pivot pin and the outer end of the coil spring secured to the retaining pin of the pivot plate. The coil spring is pre-tensioned such that it exerts a rotary force on the pivot plate urging the pivot plate, the attached side strut, and thereby the back bow and entire soft top from its collapsed configuration toward its deployed configuration. Due to this action of the coil spring, raising the soft top to its deployed configuration is assisted by the force applied by the coil spring such that a single person can deploy the soft top from one side of the vehicle with ease.

The invention will be better understood and appreciated upon review of the detailed description set forth below when taken in conjunction with the accompanying drawing figures, which are briefly described as follows.

Figure 1:
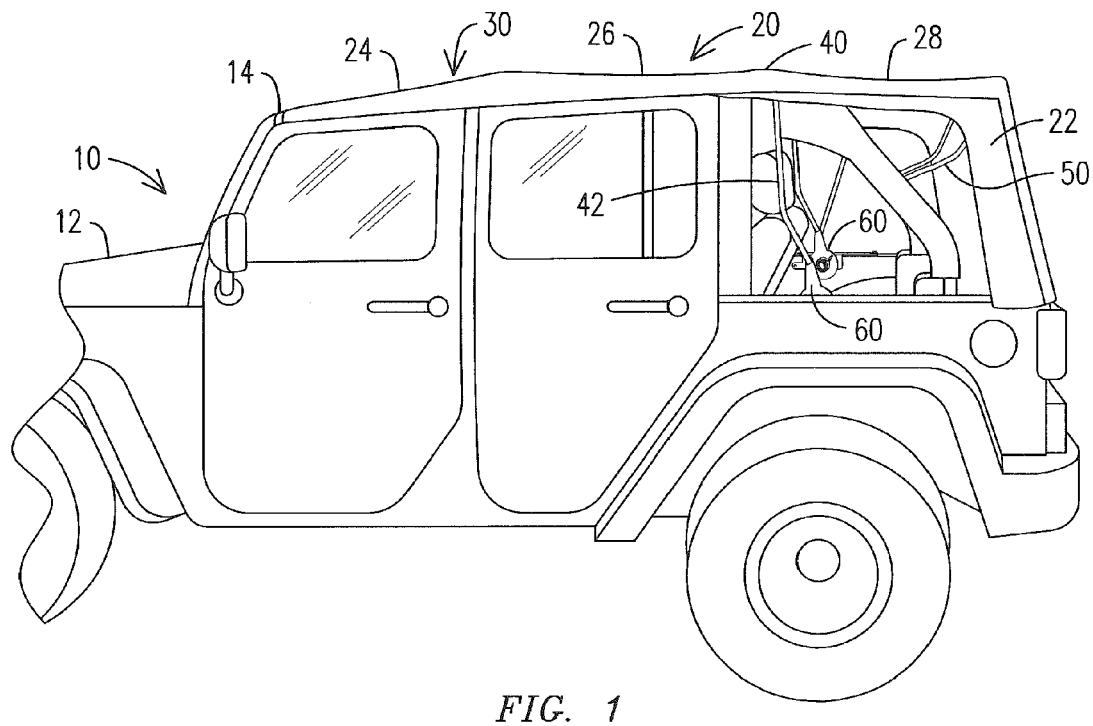
FIG. 1 is a side view of a vehicle, in this case a Jeep® brand vehicle, having a manual spring assist soft top shown in in a deployed configuration in accordance with a representative embodiment.

Those skilled in the art will appreciate and understand that, according to common practice, various features of the just described drawings are not necessarily drawn to scale, and that dimensions of various features and elements of the drawings may be expanded or reduced to more clearly illustrate the embodiments of the invention, and that the shaped and configurations of features shown in the drawing are exemplary only and are not intended to narrow the scope of the invention or the claims that define the invention.

DETAILED DESCRIPTION

Figure 2:
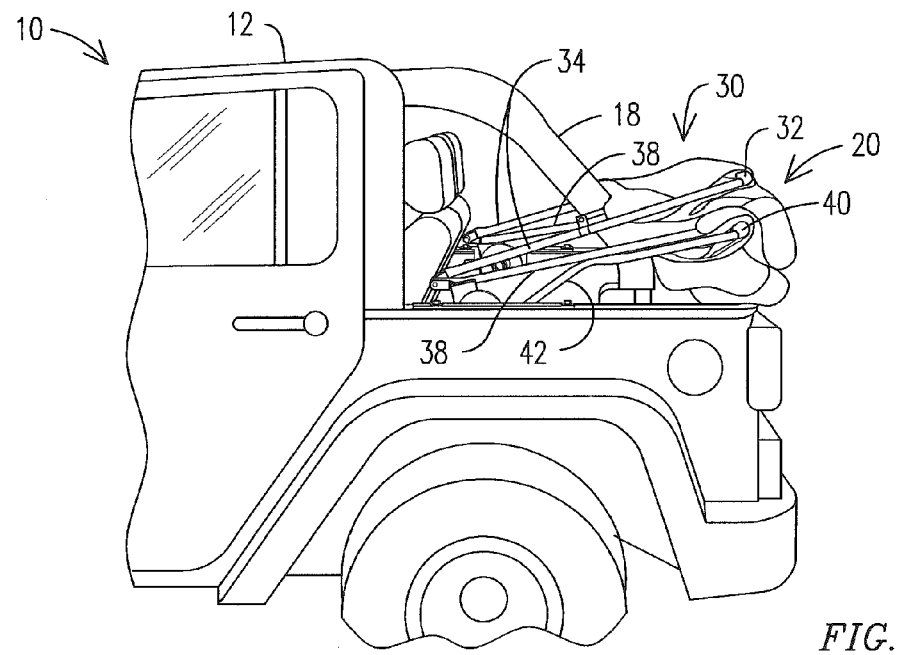
FIG. 2 is a side view of the vehicle of FIG. 1 with the spring assist soft top frame in a stowed configuration.

Referring now in more detail to the drawing figures, wherein like parts are identified with like reference numerals throughout the several views, FIG. 1 illustrates a vehicle 10 having a manually actuated and spring assisted soft top 20 in a deployed configuration over the passenger compartment of the vehicle. FIG. 2 shows the soft top 20 after it has been moved to a stowed configuration generally disposed over the cargo hold at the rear of the vehicle 10. In this configuration, the passenger compartment of the vehicle 10 is opened to ambience. As can be seen in FIGS. 1 and 2, the soft top 20 includes a flexible canvas or fabric 22, with a forward section 24 that is supported on a forward collapsible frame 30 and a back section 28 that is supported between the forward collapsible frame 30 and a rear pivoting frame 50. The forward collapsible frame 30 and the rear pivoting frame 50 can be mechanically separate from each other except for being attached by the flexible fabric 22 of the soft top 20. For example, the forward collapsible frame 30 may be coupled or secured to the main body 12 of the vehicle 10 with a spring assist mechanism 60, while the rear pivoting frame 50 may be separately coupled or secured to the roll bar 18 of the vehicle 10. The forward collapsible frame 30 and the rear pivoting frame 50 can together support the fabric 22 of the soft top 20 in the deployed configuration shown in FIG. 1, and then can collapse rearwardly and downwardly, respectively, as the soft top 20 is moved from the deployed configuration to the stowed configuration shown in FIG. 2.

Figure 3:
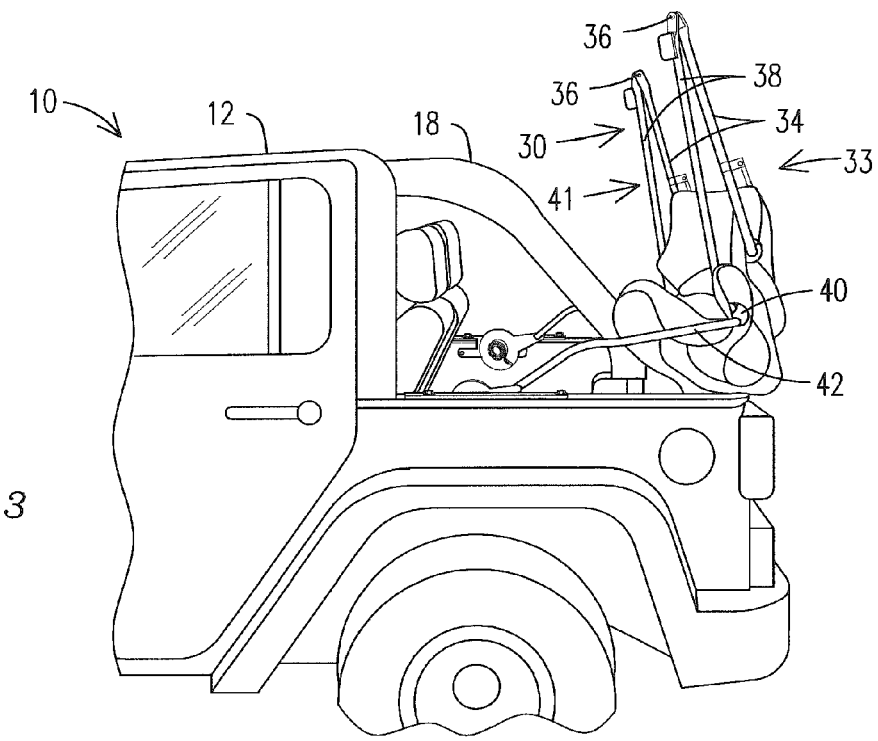
FIG. 3 is a side view of the vehicle of FIG. 1 with the spring assist soft top in a transitional configuration moving from the stowed configuration to the deployed configuration.
Figure 4:
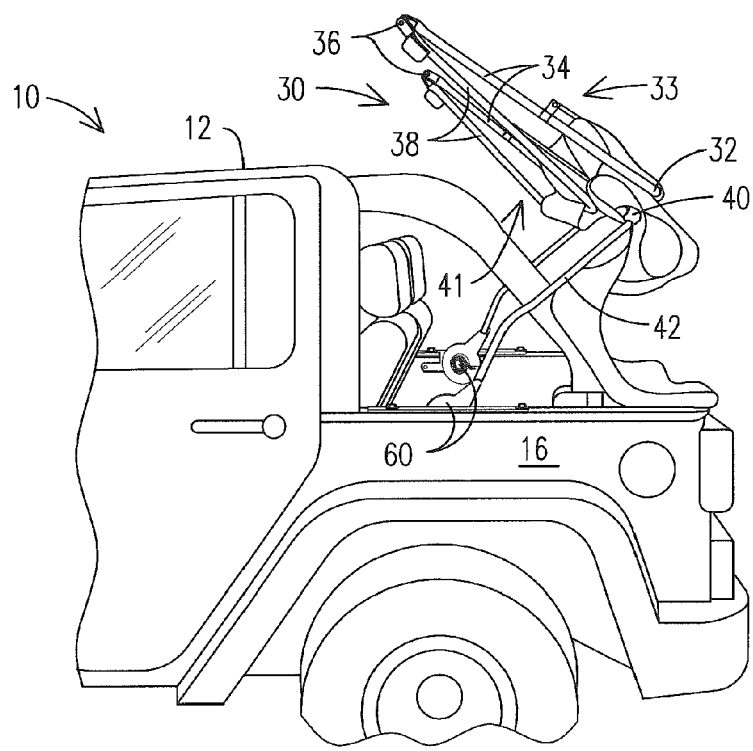
FIG. 4 is a side view of the vehicle of FIG. 1 with the spring assist soft top in another transitional configuration moving from the stowed configuration to the deployed configuration.
Figure 5:
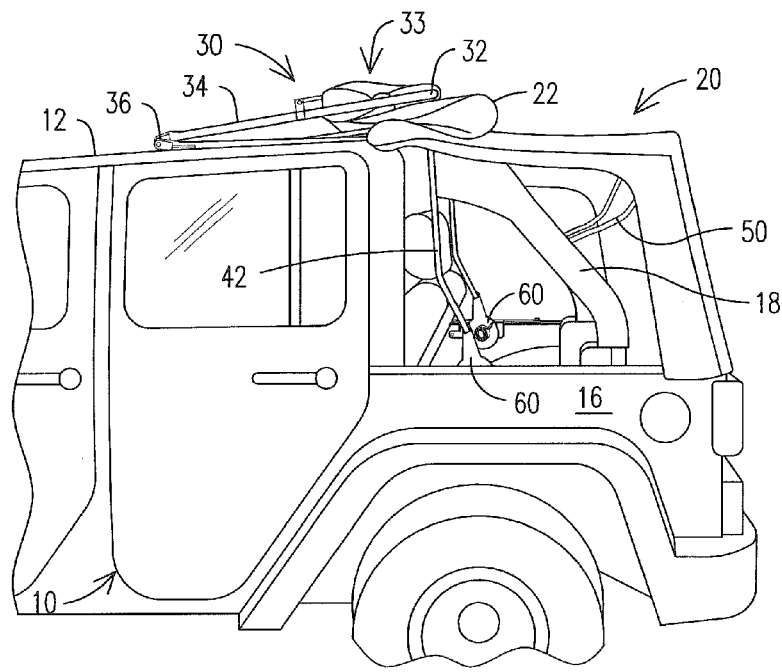
FIG. 5 is a side view of the vehicle of FIG. 1 with the spring assist soft top in a partially deployed configuration.

As best seen in FIGS. 3 and 4, the forward collapsible frame 30 can include a forward crossbar 32 and a pair of forward side struts 34 that together form a front bow 33 that supports the front end of the soft top 20 and the forward section 24 of the fabric 22. In the deployed configuration, the forward corners of the front bow 33 can be removably coupled to the body 12 of the vehicle using locking clamps 14 located proximate the windshield of the vehicle. This secures the front end of the soft top 20 into position and seals the soft top to the windshield to shield the passenger compartment against the outside elements such as wind, rain, and snow. The opposite ends of the forward side struts 34 can be rotatably connected, with a middle hinge joint 36, to the forward ends of a pair of center side struts 38 that support the center section 26 of the fabric 22. In turn, the back ends of the center side struts 38 can be rotatably connected, with a back hinge joint 46, to a back crossbar 40 that extends across the width of the vehicle 10 above a second row of seats. In the deployed configuration, both the forward side struts 34 and the center side struts 38 can be substantially aligned with the horizontal roof line of the body 12 of the vehicle 10.

In addition to being rotatably coupled to the center side struts 38, the back crossbar 40 can be rigidly coupled to a pair of back side struts 42 to form a back bow 41. The back side struts 42 can extend substantially vertically downward in the deployed configuration, with each of the lower ends of the back side struts 42 being secured to a corresponding spring assist mechanism 60, which form pivoting joints between the lower ends of the back side struts and the body 12 of the vehicle 10 behind a second row of seats. In the deployed configuration (FIG. 1), the back crossbar 40 can support both the center section 26 and back section 28 of the soft top 20.

Figure 6A:
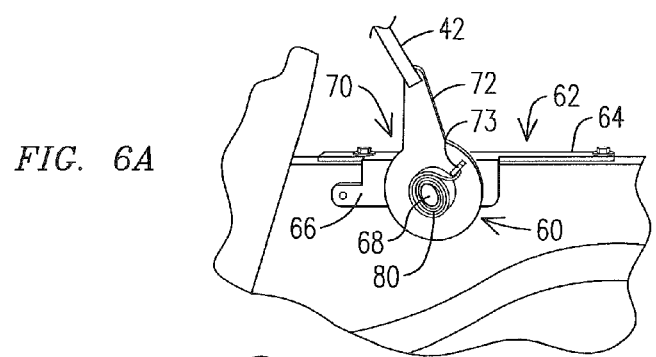
FIG. 6A is close-up side view of the spring assist mechanism of FIGS. 1-5 mounted to the vehicle and the soft top with the soft top shown in a deployed configuration.
Figure 6B:
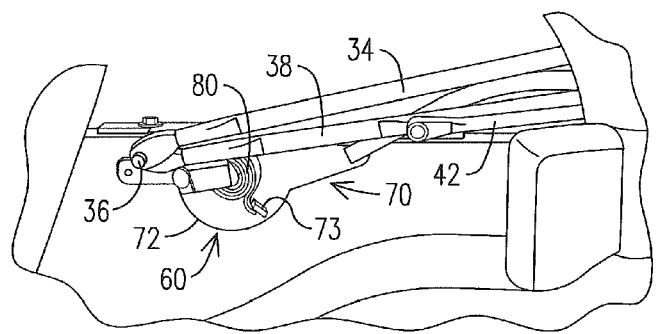
FIG. 6B is close-up side view of the spring assist mechanism of FIGS. 1-5 mounted to the vehicle and the soft top with the soft top shown in a stowed configuration.

One embodiment of the spring assist mechanism 60 is shown in more detail in FIG. 6A, which shows the soft top and frame in the deployed configuration, and in FIG. 6B, which shows soft top and frame in the stowed configuration. With the soft top in the deployed configuration (FIG. 6A), the back side strut 42 is oriented generally vertically to elevate the back crossbar 40 over the second row of passenger seats. With the soft top in the stowed configuration (FIG. 6B), the back side strut 42 is oriented generally horizontally and extends to the rear over the cargo hold of the vehicle. The forward side strut 34, the center side strut 38, and the middle hinge joint 36 on one side of the vehicle 10 can be folded down to the stowed configuration atop the back side strut 42 and the spring assist mechanism 60, so as to open the interior of the vehicle to ambience.

The spring assist mechanism 60 shown in FIGS. 6A-6B can include a bracket 62 having a horizontal mounting bar 64 secured to an outer side rail 16 of the vehicle body 12. A side plate 66 of the bracket 62 extends downwardly along the inside face of the side rail 16. A non-rotating or fixed pivot pin 68 projects from the side plate 66 generally toward the interior of the vehicle to a distal end. The pivot pin 68 is sized and configured to receive the pivot plate 72 rotatably mounted thereon and to receive the center portion of a coil spring 80 with the coil spring surrounding the pivot pin. The pivot pin 68 is milled or otherwise formed to define an axial slot 169 (FIG. 11a) sized to receive and secure an inner end 182 of the coil spring 80. The back side strut 42 is attached to a mounting arm 76 of the pivot plate 72 with a welded joint, although other means of attachment such as nuts and bolts are possible and considered to fall within the scope of the present invention. The pivot plate 72 also includes a retaining pin 73 that projects toward the interior of a vehicle to receive and capture the outer end of the biasing member or coil spring 80.

With the base plate 72 rotated upward so that the back side strut 42 is generally vertically oriented (FIG. 6A), the coil spring 80 can be in a relatively relaxed and non-tensioned state. As the base plate 72 and the back side strut 42 are rotated downward and rearward to the substantially horizontal stowed configuration (FIG. 6B), the retaining pin 73 pulls around the outer end of the coil spring 80 to tension the spring progressively and thereby to create a biasing force that resists the downward pivoting motion. In this way, the coil spring 80 bears some of the weight of the soft top 20 as it is moved from its deployed configuration to its stowed configuration. This, in turn, makes it easier for one individual on one side of the vehicle to lower the soft top when it is desired to enjoy the fresh air while driving since much of not most of the weight of the top is born by the coil springs. The spring constant of the coil spring can be selected to provide a desired ease of lowering the soft top.

Referring back to FIGS. 2-5, when it becomes desirable to raise the soft top 20 from the stowed configuration (FIG. 2) to the deployed configuration (FIG. 1), a single person can complete the process with ease by taking advantage of the biasing force that is captured within the tensioned coil spring 80. For instance, as shown in FIG. 3, the single person can first begin to raise and pivot the center side struts 38 (along with the middle hinge joint 36 and the forward side struts 34) about the back pivot joint 46. Raising the side strut is done with ease because of the assistance provided by the tensioned spring on that side. Further, raising and pivoting the center side strut on one side of the vehicle is sufficient also to raise the center side strut on the other side of the vehicle particularly where both center side struts are biased by their springs to move in this direction. Since the front of the soft top is still folded, the front end of the collapsible frame 30 and the fabric supported thereby will clear the second row of seats as the back bow 41 of the collapsible frame 30 is pivoted upwardly and forwardly around the pivot pins of the spring assist mechanisms 60 (FIG. 4).

The biasing force captured within the tensioned coil springs 80 functions to carry much of if not a majority portion of the combined weight of the top during the pivoting portion of the process (FIG. 4). At the completion of the pivoting motion, the back side struts 42 arrive at their generally vertical orientations and the back crossbar 40 reaches its deployed configuration shown in FIG. 5. A single person has only to apply a significantly reduced force to initiate and maintain the pivoting movement of the frame 30 and soft top about the spring assist mechanisms 60. The motion of the forward 24 and center 26 portions of the soft top 20 also are easily controlled with the individual's other hand until the soft top reaches the partially-deployed configuration shown in FIG. 5. At this point, the reduced weight of the forward section 24 of the fabric 22 and the front bow 33 of the collapsible frame 30 can easily be rotated forwardly about the middle hinge joint 36 by the single person until the front crossbar 32 reconnects with the attachment mechanism 14 mounted to the body 12 of the vehicle 10 proximate the windshield, as illustrated in FIG. 1.

During the upward pivoting motion of the collapsible frame 30 around the pivot pins of the spring assist mechanism 60, as shown in FIG. 4, the rear pivoting frame 50 can generally remain in place until the back section 28 of the fabric 22 draws tight between the back crossbar 40 and the rear crossbar 52. The continued pivoting motion of the collapsible frame 30 around the spring assist mechanism 60 then operates to pull the rear pivoting frame 50 upward and forward about the rear pivot mount 56 located on the roll bar 18 of the vehicle 10, until the rear frame 50 also reaches its deployed configuration shown in FIG. 5.

The coil springs 80 located within the spring assist mechanisms 60 also assists with controlling the motion of the soft top 20 as it moved from its deployed configuration (FIG. 1) to its stowed configuration (FIG. 2). For example, as may be appreciated by one of skill in the art, the tension progressively stored in the coil spring 80, which takes place during the rearward and downward pivoting motion of the back bow 41, operates to carry the load of the top progressively more as the top is lowered. It therefore is easier for a single person to control the combined weight of the frame 30 and fabric 22 as the top falls back to its stowed configuration over the cargo hold of the vehicle.

Figure 7A:
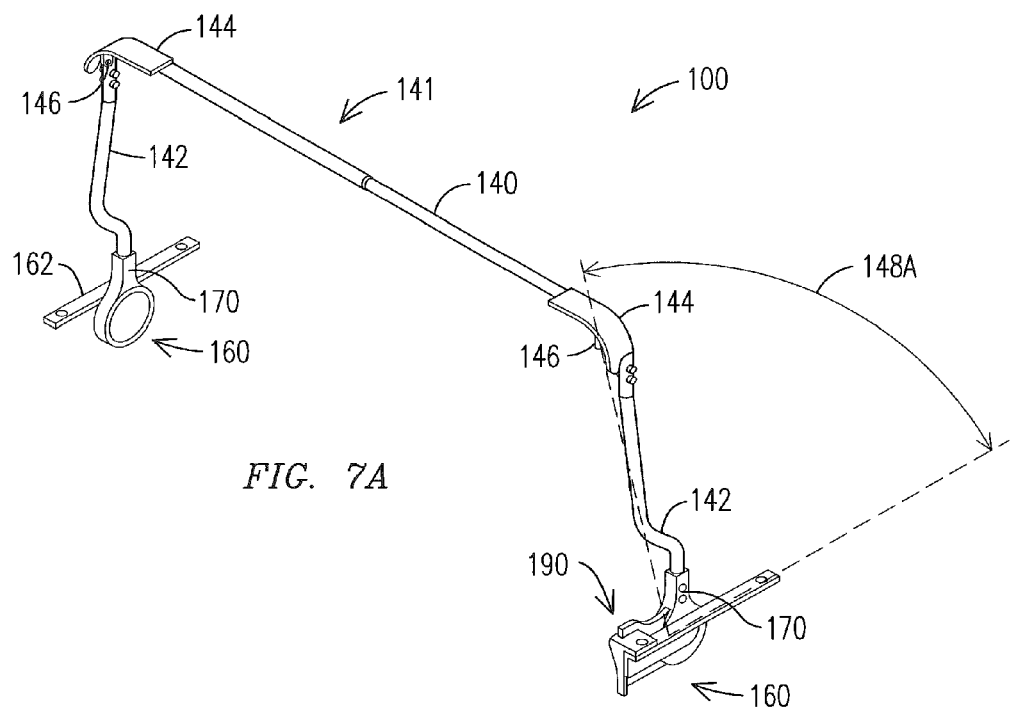
FIG. 7A is a perspective view of the back bow of a soft top frame in its deployed configuration showing each side strut of the back bow secured at its lower end to a respective spring assist mechanism on opposing sides of a vehicle.
Figure 7B:
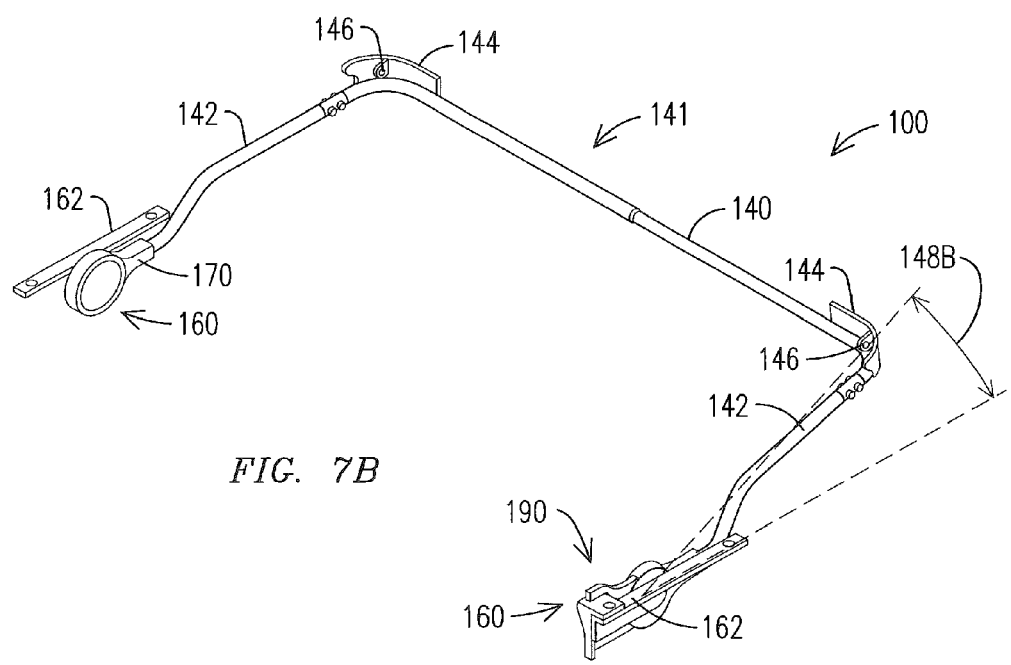
FIG. 7B is a perspective view of the back bow of a soft top frame in its collapsed configuration showing each side strut of the back bow secured at its lower end to a respective spring assist mechanism on opposing sides of a vehicle.

FIGS. 7A and 7B are front perspective views of the back bow 141 and spring assist mechanism 160 in a deployed configuration and in a stowed configuration, respectively. These figures illustrate another representative embodiment of the present invention. The back bow 141 and spring assist mechanism 160 can be marketed and sold together as an aftermarket upgrade kit 100 for converting an existing or factory soft top of a vehicle that lacks a spring assist device into an updated and improved soft top having the spring assist features described above. In making the conversion, it is generally required that the movement of the collapsible frame of the existing soft top be altered so that the folded or collapsed forward sections and center sections become rotatable about a pivot point that is located proximate the side rail of the vehicle body and behind the second row of seats, rather than at some other location on the roll bar or proximate the rear of the vehicle. Changing the location of the pivot point may require removing the existing back crossbar and associated linkage bars and replacing them with the back crossbar 140 and back side struts 142 of the present embodiment that form the updated back bow assembly 141 shown in FIGS. 7A-7B. Connection of the updated back bow assembly 141 to the spring assist mechanism 160 also may be necessary.

The back crossbar 140 can include back corner plates 144 that provide support and shape to the fabric of the soft top. The back corner plates 144 also locate a pair of back hinge brackets 146 at approximately the same locations as those of the original frame. This provides ready location of the back crossbar 140 with the center side struts of the existing soft top frame. The back hinge brackets 146 can be located interior to the back corner plates 144 of the new back bow 141 so that the new back corner plates 144 and back side struts 142 may be greater than that of the original back crossbar being replaced. Indeed, using the new back side struts 142 and spring assist mechanism 160 that mount to the side rails of the vehicle body (not shown) may often widen the stance or spacing at the base of the new back bow 141. This, in turn, can provide the pivoting structure with greater stiffness, rigidity, and support than was previously available with the existing or factory soft top frame. The increased stiffness, rigidity, and support provided by the new back bow 141, along with the dynamic assistance provided by the spring assist mechanism 160, significantly enhances the ability of a single person to deploy and retract the converted soft where two people usually are required to manage the original or factory soft top.

Each spring assist mechanism 160 can generally include a pivot plate 170 that is rotatably supported on a fixed bracket 162 secured to a side rail of the vehicle (not shown). In addition, one or both of the spring assist mechanism 160 may optionally include a locking member 190 that serves to lock the back bow 141 in its stowed configuration (FIG. 7B) until released, and to keep the compressed spring from inadvertently raising the soft top during movement of the vehicle.

Figure 8:
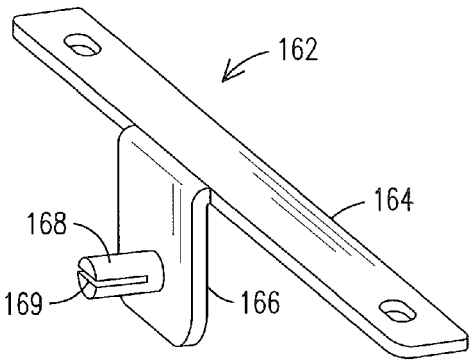
FIG. 8 is a perspective view of a bracket of one of the spring assist mechanisms of FIGS. 7A-7B.

FIG. 8 is a close-up perspective view of a bracket 162 of one of the spring assist mechanism of FIGS. 7A-7B. The bracket 162 can include a horizontal mounting bar 164 for mounting atop a side rail of a vehicle body (not shown). A side plate 166 extends downwardly from the mounting bar 164 along the inside face of the side rail. A fixed or non-rotating pivot pin 168 extends from the side plate 66 toward the interior of a vehicle. The pivot pin 168 can also include a first spring attachment feature. In the illustrated embodiment, the attachment feature comprises a slot 169 extending axially along the pivot pin.

Figure 9:
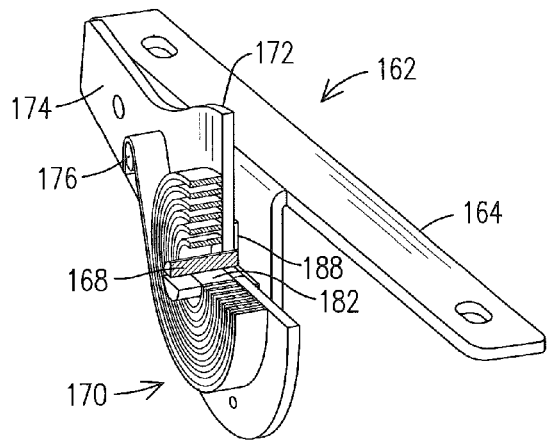
FIG. 9 is a cross-sectional perspective view of one of the spring assist mechanism of FIGS. 7A-7B showing the coil spring tensioned and secured at its ends to the pivot rod and to the pivot plate.

FIG. 9 shows the spring assist mechanism 160 with the pivot plate 172 and the coil spring 180 mounted thereto. The pivot plate 172 is rotatably received on the pivot pin 182 against the side plate 166. The coil spring 180 also is received on the pivot pin adjacent the pivot plate 172 with the inner end of the pivot pin received in the slot 169 to restrain the inner end of the coil spring against rotary movement. The outer end of the coil spring 180 is formed with a hook that extends over a retaining pin 176 extending from the pivot plate 172. Low friction washers, such as bronze washers 188, can be disposed between the face of the rotating pivot plate 172 and the side plate 166 of the bracket 162 and also between the pivot plate and the coil spring if desired. A mounting arm 174 projects radially from the pivot plate 172 and is configured to receive and secure the bottom end of a back side strut 142 (FIG. 7a) of a back bow assembly 141. The coil spring thus applies a polar force to the attachment arm 174 that assists in the deployment of the modified soft top as discussed in detail above.

Figure 10:
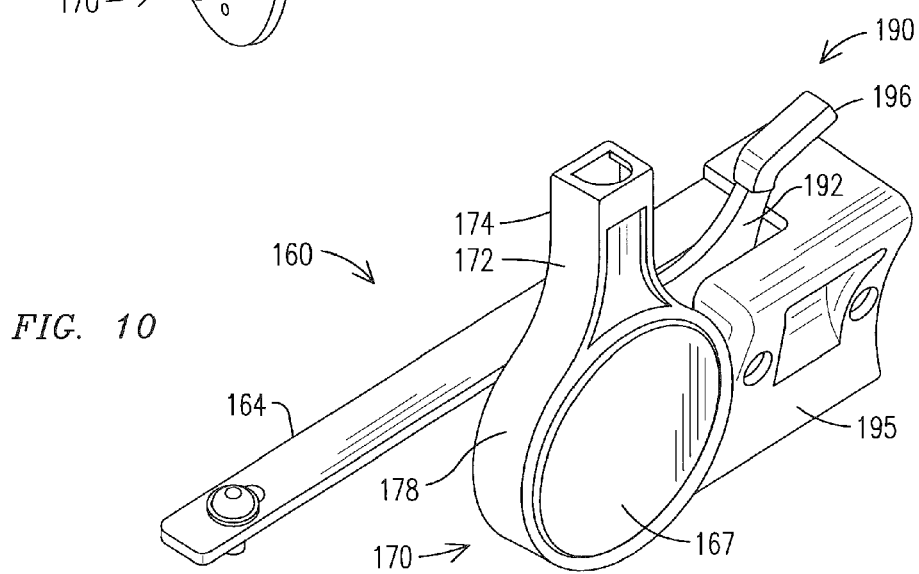
FIG. 10 is a perspective view of one of the spring assist mechanism FIGS. 7A-7B in a deployed configuration with a cover attached.

FIG. 10 illustrates a completed spring assist mechanism 160 for the consumer market. The completed mechanism may include a housing 178 that couples with the base plate 172 to cover and protect the coil spring 180. The cover plate 167 may be attached to the underlying pivot pin of the bracket 162, rather than to edges of the housing 178, so that the cover plate remains fixed in position while the pivot plate 170 rotates between the deployed and stowed configurations. The cover plate also can be coupled to the movable housing if desired and can include a brand logo. A locking member 190 can be incorporated to lock a soft top in its stowed configuration and can comprise a pawl 192 and a release handle 196.

Referring again to FIGS. 7A and 7B, the angular positioning 148 of the back bow 141 relative to the bracket 162, and the range of rotation provided by the spring assist mechanism 160 are illustrated. For instance, in the deployed configuration of FIG. 7A, the back side struts 142 can be generally vertical, meaning that they extend generally in an upward direction. Where a forward bend in the back side struts 142 is incorporated, the back cross bar 140 is positioned slightly forward from directly over the spring assist mechanism 160 so that it ma align properly with the seats and headrests of a vehicle. This can cause the angle 148A between the horizontal mounting bar 164 (FIGS. 8-9) of the bracket 162 and a line drawn between the pivot pin 168 and the back hinge 146 that connects the back cross bar 140 with the center side struts (not shown) to range from about 95 degrees to about 110 degrees.

Similarly, in the stowed configuration of FIG. 7B, the back side struts 142 can be generally horizontal, meaning that they extend generally in a rearward direction. A forward bend in the back side struts 142 can raise the back cross bar 140 slightly above the tail gate of the vehicle (such as shown in FIGS. 2 and 3). Further, the angle 148B between the horizontal mounting bar 164 (FIGS. 8-9) of the bracket 162 and the line drawn between the pivot pin 168 and the back hinge 146 can range from about 5 degrees to about 20 degrees. Thus, the total range of angular motion of the pivoting back bow 141 between the deployed and stowed configurations can generally be about 90 degrees, although in various aspects of the present disclosure the total range of angular motion can range from about 75 degrees to about 105 degrees depending upon application specific requirements.

Figure 11A:
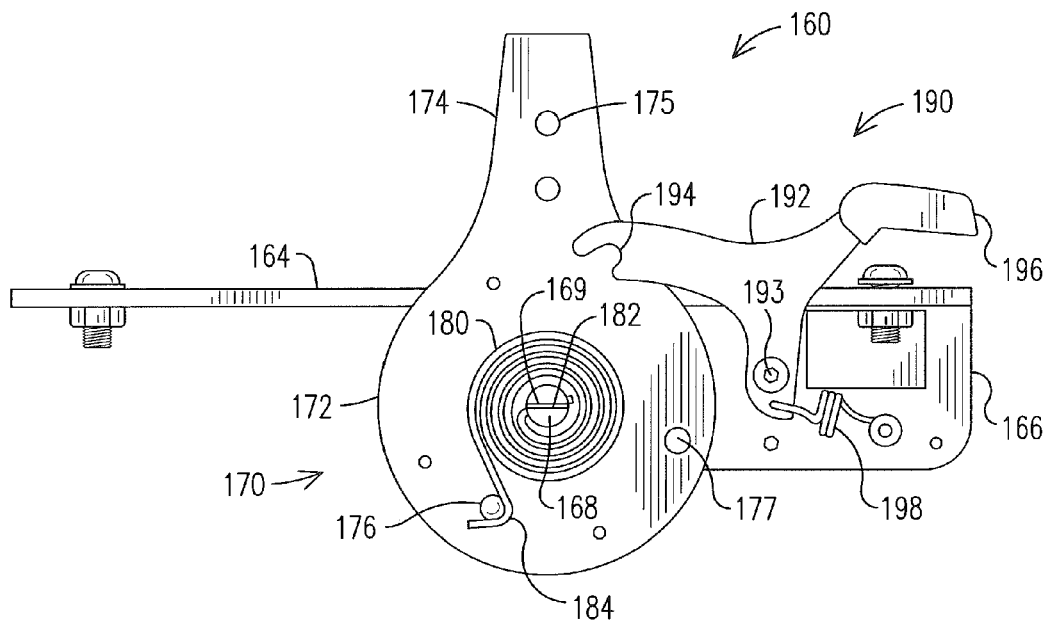
FIG. 11A is an internal side view of the spring assist mechanism of FIG. 10 showing the condition of the coil spring when the mechanism is in a deployed configuration.
Figure 11B:
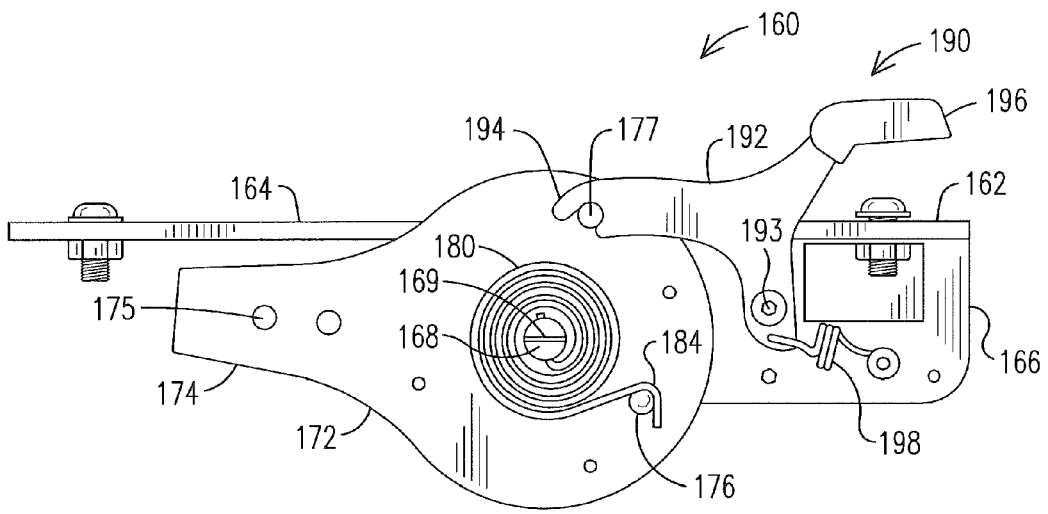
FIG. 11B is an internal side view of the spring assist mechanism of FIG. 10 showing the condition of the coil spring when the mechanism is in a stowed configuration.

FIGS. 11A and 11B are internal side views of the spring assist mechanism 160 in the deployed and stowed configurations, respectively, with the protective cover removed to reveal components of the mechanism. The spring assist mechanism 160 includes optional locking member 190 that can serve to lock the back bow (not shown) in the stowed configuration until released. The locking member 190 can include a pawl 192 that is rotatably mounted to a pawl pivot 193 that extends inwardly from the side plate 166 of the bracket 162. On one side of the pawl pivot 193, the pawl 192 can include an arm with a recess 194 sized and shaped to engage with a locking pin 177 that projects inwardly from the base plate 172 of the pivot plate 170. An expansion spring 198 can be coupled between the pawl 192 and the side plate 166 of the bracket 162. The expansion spring 198 can yieldably maintain the rotatable pawl 192 in an engaging position with the locking pin 177 when the pivot plate 170 has been rotated to the stowed configuration shown in FIG. 11B. This prevents the stowed soft top from bouncing upwardly when the vehicle encounters rough terrain. To return the soft top to the deployed configuration, a downward force can be applied to the handle 196 of the locking member 190 to rotate the pawl 192 against the bias of the expansion spring 198 and release the locking pin 177 from the recess 194. This allows the pivot plate 170 to rotate back to the vertical position of FIG. 11A under the influence of the biasing force captured within the compressed coil spring 180 and/or an initiating and directing force applied by an individual.

A second or intermediate locking pin (not shown) can added to the base plate 172 for locking the pivoting back bow 141 in a position between the deployed and stowed configurations described above. In this way, a single person to lock the soft top in its intermediate position, move to the back of the vehicle to fold and smooth the fabric of the soft top as desired, and then pivot the back bow 141 all the way downward to its fully stowed configuration.

FIGS. 11A and 11B perhaps better illustrate the slot 169 that is in the distal end portion of the pivot pin 168 to receive the inner end 182 of the coil spring 180 and the retaining pin 176 that extends inwardly from the base plate 172 of the pivot plate 170 to engage with the hook on the outer end 184 of the coil spring. Provisions for mounting the back side strut (not shown) to the neck portion 174 of the base plate 172, such as bolt holes 175, also are illustrated in the drawings.

The invention has been described in terms of preferred embodiments and methodologies considered by the inventors to represent the best modes of carrying out the invention. However, a wide variety of additions, deletions, and modification might well be made to the illustrated embodiments by skilled artisans without departing from the spirit and scope of the invention. For example, various other types of biasing members, including but not limited to linear and non-linear springs or hydraulic and pneumatic compression devices, may be used between the bracket and pivot plate of the spring assist mechanism to create the biasing force that resists the downward pivoting motion of the back bow and acts to return the rotatable pivot plates and back side struts to their substantially vertical and upright orientations. In addition, different methods or devices for attaching the biasing member between the bracket and pivoting member, other than with a fixed slot or projecting pins, are also possible. These and other revisions might be made by those of skill in the art without departing from the spirit and scope of the invention, with is constrained only by the claims.

What is claimed is:

1. A retractable soft top for a vehicle, the soft top comprising a collapsible frame that supports a fabric covering with the frame including a back bow formed with spaced side struts joined at their upper ends by a cross bar, the retractable soft top further comprising:

a first pivoting mount on one side of the vehicle, the lower end of one of the side struts being attached to the first pivoting mount;

a second pivoting mount on an opposite side of the vehicle, the lower end of the other side strut being attached to the second pivoting mount;

the first and second pivoting mounts facilitating pivotal movement of the back bow between a generally vertical deployed configuration and a generally horizontal stowed configuration;

at least one of the pivoting mounts comprising:

a bracket configured to be secured to the body of the vehicle on one side thereof;

a pivot pin fixed at one end to the bracket and extending to a distal end;

a pivot plate rotatably supported on the pivot pin;

an attachment feature on the pivot plate displaced from the pivot pin;

the pivot plate forming an attachment arm configured to be fixed to the lower end of the respective side strut;

the pivot plate facilitating pivotal movement of the respective side strut and the back bow between the deployed and the stowed configurations; and a biasing member having a first end fixed relative to the bracket and a second end coupled to the attachment feature;

the biasing member being configured to urge the pivot plate and the attached side strut and back bow toward the vertical deployed configuration thereby aiding manual deployment of the soft top.

2. A retractable soft top as claimed in claim 1 wherein the biasing member comprises a coil spring.

3. A retractable soft top as claimed in claim 2 wherein the coil spring surrounds the pivot pin.

4. A retractable soft top as claimed in claim 3 wherein an inner end of the coil spring is fixed to the pivot pin.

5. A retractable soft top as claimed in claim 4 wherein the pivot pin comprises a slot and wherein an inner end of the coil spring is disposed in the slot.

6. A retractable soft top as claimed in claim 1 wherein the at least one pivoting mount comprises both of the pivoting mounts.

7. A retractable soft top as claimed in claim 1 further comprising a locking mechanism configured to lock the pivoting mount and the attached side strut and back bow releasably in their stowed configurations.

8. A vehicle comprising a retractable soft top as claimed in claim 1.

\* \* \* \* \*